United States Patent
Paul et al.

[15] 3,698,181
[45] Oct. 17, 1972

[54] ROLLER CHAIN DISCONNECTOR APPARATUS

[72] Inventors: William T. Paul, Holyoke; Wayne R. Tracy, Willimansett, both of Mass.

[73] Assignee: North American Rockwell Corporation, Pittsburgh, Pa.

[22] Filed: Oct. 29, 1970

[21] Appl. No.: 85,059

[52] U.S. Cl. .................................................59/11
[51] Int. Cl. .............................................B21l 21/00
[58] Field of Search .....................59/7, 11; 72/409

[56] References Cited

UNITED STATES PATENTS

| | | | |
|---|---|---|---|
| 3,156,087 | 11/1964 | Granberg | 59/7 |
| 2,811,065 | 10/1965 | Johnson | 72/409 |
| 2,799,191 | 7/1957 | Barnes | 72/409 |

FOREIGN PATENTS OR APPLICATIONS

| | | | |
|---|---|---|---|
| 246,684 | 2/1926 | Great Britain | 59/7 |
| 180,458 | 6/1922 | Great Britain | 59/7 |
| 213,780 | 4/1924 | Great Britain | 59/7 |

Primary Examiner—Charles W. Lanham
Assistant Examiner—Gene P. Crosby
Attorney—John R. Bronaugh, Floyd S. Levison, E. Dennis O'Connor and Richard A. Speer

[57] ABSTRACT

Apparatus for disconnecting the interconnections of a power transmitting chain wherein a chain link pin forcer means is mounted on a first closing arm of a toggle and a chain holder means is spaced from the chain link pin forcer means and mounted on a second closing arm of the toggle. The holder means acts as a base for mounting a link pin interconnecting two link sub-assemblies. Hinge means pivot the closing arms in opposite directions about a toggle joint which interconnects the closing arms, thereby applying a multiplied closing force to the link pin force means and thereby forcing the link pin free of the sub-assemblies.

4 Claims, 3 Drawing Figures

INVENTORS
WILLIAM T. PAUL
WAYNE R. TRACY

ROLLER CHAIN DISCONNECTOR APPARATUS

BACKGROUND OF THE INVENTION

1. Field of the Invention

Power transmitting roller chains are composed of roller link sub-assemblies and link pin sub-assemblies. A roller link sub-assembly is composed of two roller bushings held in spaced relation by two chain plates. Adjacent roller link sub-assemblies are interconnected by a link pin sub-assembly comprising two link pins held in spaced relation by two outer chain plates. Each of these link pins passes through a roller bushing of a different roller link sub-assembly, thereby linking adjacent roller link sub-assemblies. In order to disconnect a roller chain for varied purposes, such as chain shortening, link sub-assembly repair or replacement, it is the object of this invention to force the link pin, usually riveted at each end, through the said roller bushing.

2. Description of the Prior Art

Hand-operated chain breakers as such are known to the prior art. Conventionally, it has been known to use a chain breaker having a forcing screw with a hardened tip. Force is applied to the link pin by rotating and advancing the forcing screw by means of a handle fitting through a hole in one end of the forcing screw. Two opposing vise jaws hold the roller bushing while the handle is rotated, thereby bringing the hardened tip of the spring forced screw into engagement with a riveted end of a link pin.

The above-described operation has certain disadvantages of which it is an object of this invention to overcome. A major disadvantage is the fact that two-hand operation requires a high degree of manual dexterity. One hand holds an arm mounting vise jaws gripping the roller bushing while the other hand rotates the handle arm to lower the screw forcer. Another disadvantage is that the operator must exert considerable force in rotating the handle. A further disadvantage is that time is consumed in making the several rotations necessary to force or pop the riveted link pin. A further disadvantage is that the vise jaws of the conventional type must grip on opposite sides of the pin. On many types of chain with standard attachment plates, this is not possible, thereby requiring chain disconnection by other means.

SUMMARY OF THE INVENTION

This invention employs a force multiplying toggle clamp in place of the prior art rotating force screw principle. An adjustable link pin forcer means, such as a screw having a hardened tip, is mounted on one arm end of the toggle clamp. Chain holder means acting as a roller bushing support is mounted on the opposing arm end of the toggle clamp. This chain holder means may be in the form of a rotatable turret having multiple open fork arms or jaws for different sized roller bushings. Once the roller chain link interconnection is mounted on the adjustable turret, a single hand of an operator can easily close the toggle clamp handle arms, thereby generating a multiplied closing force to the toggle clamp arm ends, which force can be in the neighborhood of 2,400 lbs. pushing force depending, of course, on the sizing of the various parts. The riveted link pin is thus quickly forced or popped through the roller bushing by the link pin forcer screw.

It is an object of this invention to enable the operator to readily effect chain disconnection with only a minimum of manual dexterity. It is a further object of this invention to enable the operator to use hand force multiplied by toggle leverages to effect chain disconnection. It is a further object of this invention to enable the operator to effect chain disconnection using only a single hand. Another object of this invention is to reduce the time required to effect chain link disconnection, thereby minimizing expensive down time of machinery driven by a power transmitting link chain. It is yet a further object of this invention to provide a novel method of disconnecting the chain link sub-assemblies by driving a link pin free of such sub-assemblies. It is another object of this invention to provide a disconnector which mounts the chain on one side only and which further can be used to mount a variety of different sized chains.

BRIEF DESCRIPTION OF THE DRAWINGS

Other features of the invention will become apparent from the following more detailed description and from the accompanying drawing, in which.

DESCRIPTION OF THE PREFERRED EMBODIMENT

The apparatus constructed in accordance with this invention is adapted to force or pop the link pin used to interconnect the roller link sub-assembly and the link pin sub-assembly of the typical power transmitting roller chain. The apparatus is a hand-operated tool adapted to accomplish this object with a minimum of effort exerted by the operator and at a rate previously unknown to the prior art.

Figure 1:
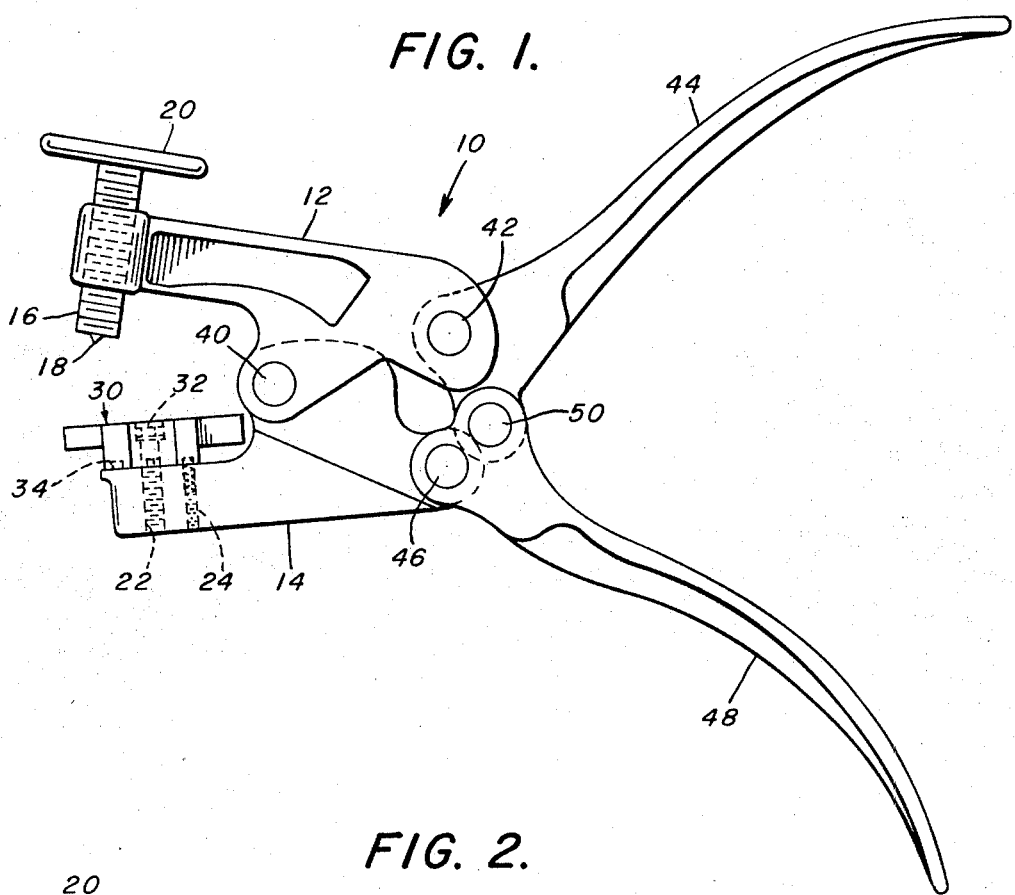
FIG. 1 is a side elevational view of the apparatus constructed in accordance with this invention showing the toggle apparatus in the open position.
Figure 2:
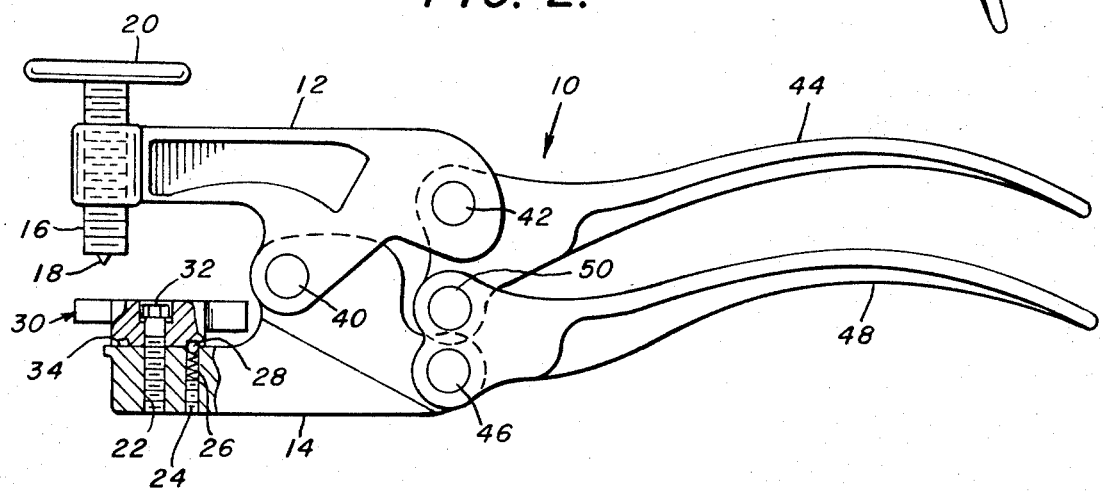
FIG. 2 is a side elevational view of the apparatus of FIG. 1 in partial section showing the toggle apparatus in the closed position.
Figure 3:
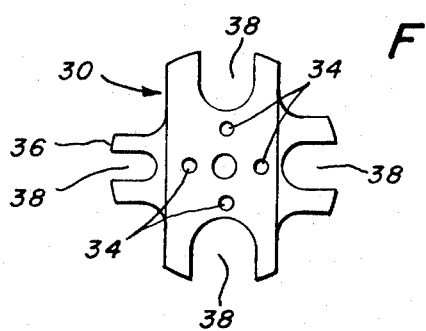
FIG. 3 is a bottom view of chain holder means of the apparatus of FIG. 1 illustrating the detent cavities.

A typical toggle plier or clamp generally referred to as 10 has an upper closing arm 12 and a lower closing arm 14. Link pin forcer means adjustable to move up and down and to be held in one place on closing arm 12, such as threaded link pin forcer screw 16, having a hardened tip 18 at one end and an adjustment handle 20 at the other end is mounted in a threaded bore hole at one end of upper closing arm 12 as shown in FIGS. 1 and 2. It should be noted that the purpose of making screw 16 adjustable is to take maximum advantage of the large force multiplication of the toggle mechanism.

A chain holder means in the form of a turret 30 is rotatably mounted on the lower arm 14 by means of a pivot post such as an internally seated hexhead bolt 32 which is fixedly attached to arm 14 by engaging a threaded channel 22. As best seen in the partial sectional view of FIG. 2, turret 30 can rotate about the longitudinal axis of bolt 32. Turret 30 has a two-diameter bore hole extending through its central portion. The larger diameter portion of the bore hole surrounds the head of bolt 32 while the smaller diameter portion of said bore hole surrounds the shaft portion of the bolt. A spring plunger detent channel 24 extends through arm 14's base. Detent means in the form of spring plunger 26 and ball 28 is placed in the channel 24. This detent ball 28 partially extends through a narrower portion of channel 24 to engage a detent depression 34 located in the bottom surface of turret 30.

A firm rotation of the turret 30 deposes the spring loaded ball 28 sufficiently to clear the detent depression 34 in the underside of the turret when indexing is necessary. A detent depression 34 is provided for each index position of the turret. Other forms of detent means than a spring loaded plunger ball detent could also be used, as for example, a set screw could engage detent depressions 34.

Multiple fork arms or jaws 36 having different sized openings 38 extend radially from the core of the turret. Different sized roller bushings can thus fit within the corresponding openings 38.

Each of these forks when indexed to the forward position fits partially around the roller of a specific size roller chain and extends between the chain plates mounting the roller, thus supporting them and at the same time locating the chain link pin under the hardened tip 18 of the threaded adjustable forcing screw 16.

Other forms of chain holder means could be employed, such as mounting a fixed body and a movable body (not shown) on arm 14's base. The movable body could move by means of a threaded guide so as to be adjustable for different sized chain links.

The toggle plier or clamp linkage system shown in FIGS. 1 and 2 consists of the following elements. Both closing arms 12 and 14 have knees intermediate their ends, which knees are pivotally interconnected by a first toggle joint 40. Closing arm 12 has one arm end pivotally connected or hinged at 42 to one end of closing toggle handle arm 44. Lower closing arm 14 similarly has one end pivotally connected or hinged at 46 to one end of closing toggle handle arm 48. Both toggle handle arms 44 and 48 have knees adjacent their pivoted ends which knees are pivotally interconnected by a second toggle joint 50. Thus, it can be seen from a comparison of FIGS. 1 and 2 that closure of the toggle handles 44 and 48 causes displacement of both toggle joints 40 and 50 thereby generating a greatly multiplied closing force to the free ends of closing arms 12 and 14.

The amount of closing force that the chain link pin forcer means is capable of applying is dependent on the leverage lengths and pivot point positions of the toggle mechanism. As is well known, these leverage links can be varied depending on the maximum closing force for which the toggle is designed to generate. In the preferred embodiment illustrated in FIGS. 1 and 2, satisfactory link pin disconnection has been achieved by a toggle mechanism designed to generate 2,400 lbs. closing force to be applied by the chain link pin forcer means.

Although apparent from the above detailed description of the preferred embodiment, the operation of disconnecting the chain sub-assemblies using the above described apparatus is as follows: The link pin interconnecting the chain link sub-assemblies is first placed in a holding means such as the fork arm openings of the turret 30. A fork arm opening is chosen which corresponds to the diameter of the particular sized roller bushing in the chain link being disconnected. The chosen fork arm is indexed to the forward position where the chain link interconnection is mounted thereon. The threaded link pin forcer screw is then adjusted to bring it into touching contact with an end of link pin held by the turret fork arm. Adjustment of the screw 16 is made to secure the screw from movement with respect to upper arm 12. Pressure is then applied to close toggle handles 44 and 48, thereby applying a multiplied force to screw tip 18 which drives or pops the link pin through the chain plates and roller bushing in which the pin is seated. Hand or machine pressure, such as a vise, can be used to close toggle handles 44 and 48.

A method of disconnecting a link pin from power transmitting chain link sub-assemblies is as follows: The first step is to securely mount the chain link sub-assemblies to be disconnected so as both ends of the link pin are accessible to a driving tool. This mounting can be on a fixture holder means such as turret fork arms 36. Other fixture holder means, such as movable vise jaws (not shown), could also be used. The next step is to align a link pin forcer means, such as screw 16, over one of the accessible pin ends. A multiplied closing force is then applied to a link pin end by means of a toggle joint, such as 40, moving the link pin forcer means into driving contact with the link pin and thereby forcing the link pin free of the power transmitting chain link sub-assemblies.

Having thus described the invention in rather complete detail, it will be understood that these details need not be strictly adhered to and that various changes and modifications may be made, all falling within the scope of the invention as defined by the following claims.

We claim:

1. Apparatus for disconnecting the interconnections of a power transmitting chain comprising link sub-assemblies interconnected by link pins, said apparatus comprising a first closing arm pivotally connected by a toggle joint with a second closing arm;

chain link pin forcer means mounted on said first closing arm; said chain link forcer means having means to adjust its position with respect to said first closing arm;

a rotatable turret means spaced from said chain link pin forcer means and mounted on said second closing arm;

said turret means adapted to provide a mounting base for a link pin interconnecting two of said link sub-assemblies;

said closing arms being pivotally connected by hinge means for pivoting said closing arms in opposite directions about said toggle joint, thereby applying a multiplied closing force to said first and second closing arms whereby said link pin is forced free of said link sub-assemblies.

2. The apparatus as recited in claim 1 wherein said turret means has at least one fork means to engage the interconnection of two of said link sub-assemblies.

3. The apparatus as recited in claim 1 further comprising a detent means mounted on said second closing arm to restrain rotation of said rotatable turret.

4. The apparatus as recited in claim 3 wherein said detent means is a spring loaded plunger ball.

* * * * *